Feb. 18, 1930.  C. J. SIEFARTH  1,747,910
VARIABLE PRESSURE VALVE
Filed Feb. 13, 1928   2 Sheets-Sheet 1
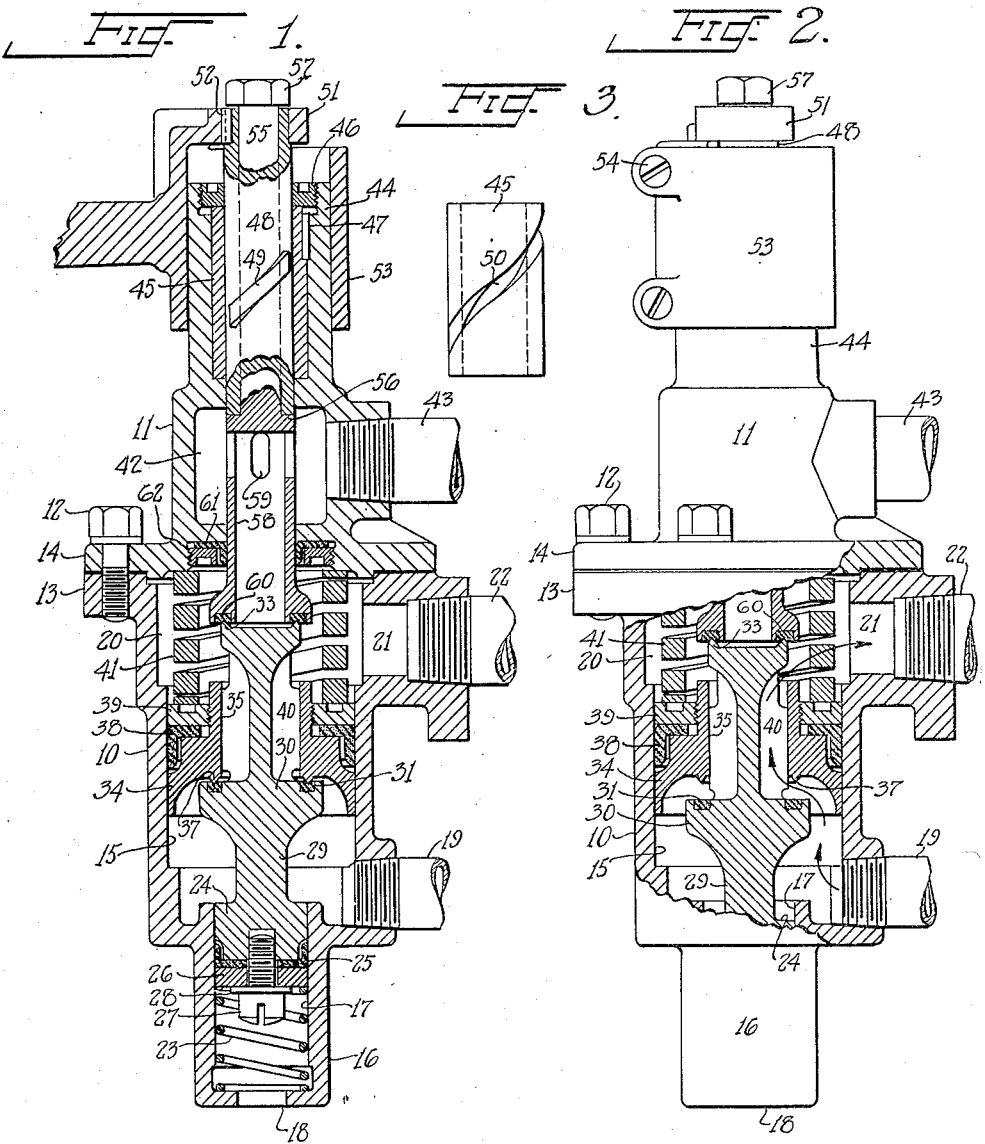
INVENTOR
C. J. Siefarth
BY C. B. Birkenbeuel.
ATTORNEY Feb. 18, 1930.     C. J. SIEFARTH     1,747,910
VARIABLE PRESSURE VALVE
Filed Feb. 13, 1928     2 Sheets-Sheet 2
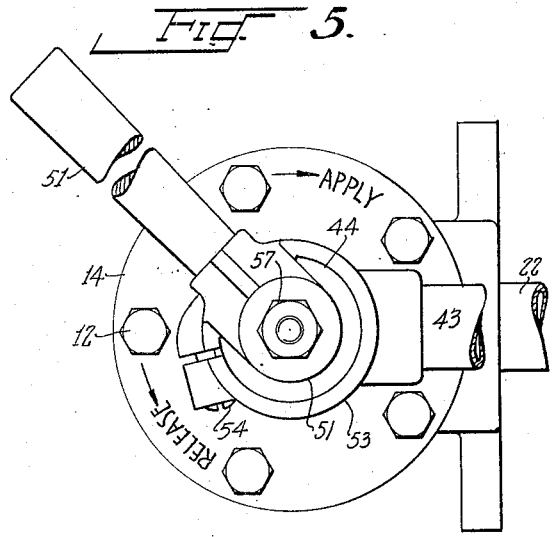
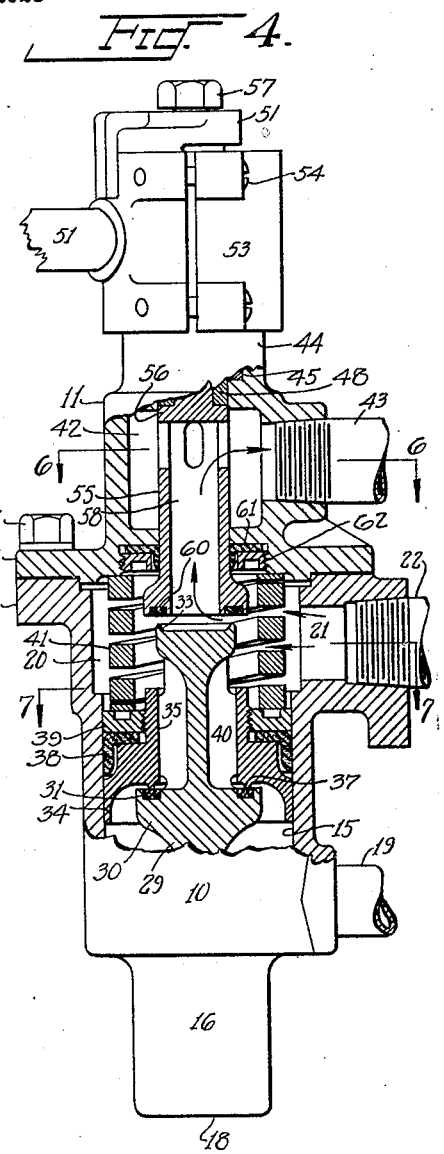
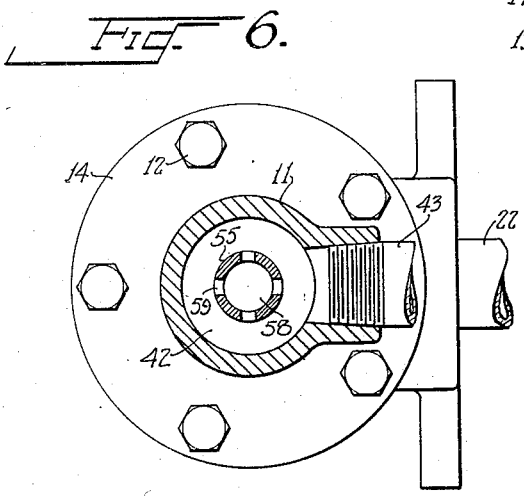
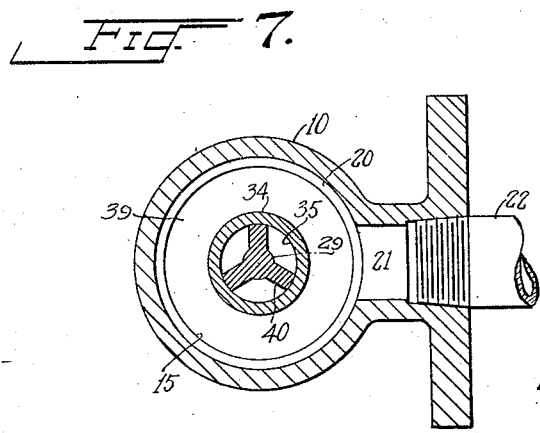
INVENTOR
C. J. Siefarth
BY C. B. Birkenbeul
ATTORNEY Patented Feb. 18, 1930

1,747,910

UNITED STATES PATENT OFFICE

CHESTER J. SIEFARTH, OF PORTLAND, OREGON

VARIABLE-PRESSURE VALVE

Application filed February 13, 1928. Serial No. 253,875.

This invention relates generally to valves, and particularly to pressure-controlling devices.

The main object of this invention is to provide a simple, efficient and sensitive form of variable pressure valve by means of which air pressure may be reduced and controlled automatically and continuously as long as the pressure from the source of supply exceeds that to which the device is adjusted.

The second object is to reduce the number of parts and special springs to the minimum and to so construct same that they will be easy to manufacture and assemble and not subject to chattering or vibrating, as is frequently the case with devices of this nature.

The third object is to so construct the device that gradual applications and releases of pressure can be secured by the mere positioning of a hand lever.

The fourth object is to require the employment of only one main operating spring and a small auxiliary spring having no other function than to hold parts in position when the supply pressure is removed.

The fifth object is to make it possible to secure practically the full flow of air through the device from a supply line to a delivery line thereby enabling same to handle large quantities of air in an efficient manner.

These, and other objects, will become more apparent from the specification following as illustrated in the accompanying drawings, in which:

Figure 1 is a vertical section through the device in a normal position, that is to say, with no air flowing through same. Figure 2 is a side elevation of the device showing a portion of same in section with the parts in position for the delivery of air at a reduced controlled pressure. Figure 3 is a detailed view of the operating nut. Figure 4 is a view similar to Figure 2 showing the parts in a releasing position in which air is not being admitted from the source of supply but is being exhausted from the element to which it was previously delivered and wasted to the atmosphere. Figure 5 is a plan of the device. Figure 6 is a section taken along the line 6—6 in Figure 4. Figure 7 is a horizontal section taken along the line 7—7 in Figure 4.

Similar numbers of reference refer to similar parts throughout the several views.

Referring in detail to the drawings, the device may be divided into two principal parts, namely a body 10 and a cap 11, the two being joined by the screws 12 which pass through the flanges 13 and 14 of the body 10 and the cap 11.

It will be assumed, for convenience, that the valve is just in the position shown in the drawings—that is with the body 10 lowermost. Within the body 10 is formed a main cylinder 15 and at the lower end thereof is formed an extension 16 in which is formed an auxiliary cylinder 17 whose lower end 18 opens to the atmosphere.

An air supply pipe 19 opens into the lower end of the main cylinder 15. The upper portion of the body 10 is provided with a somewhat enlarged cavity 20 above the cylinder 15 from which opens a branch 21 to which is connected the delivery pipe 22 from which may be taken the controlled air.

In the lowermost portion of the auxiliary cylinder 17 is placed an auxiliary spring 23 which bears against the lower end 18 of the member 16. Within the cylinder 17 is placed an auxiliary piston 24 provided at its lower end with a cup leather 25, a cup washer 26, a clamping screw 27 and a lock washer 28.

The piston 24 is provided with an integral rod 29 around whose middle portion 30 is formed a valve seat 31. Within the cylinder 15 is placed the main piston 34 around whose cylindrical central opening 35 is formed an annular inlet valve 37 adapted to seat in the valve seat 31 under certain conditions, which will be explained later.

On the upper side of the piston 34 is mounted a cup leather 38 which is held in place by the nut 39. Ribs 40 on the side of the rod 29 guide the upper end of the rod 29 within the cylindrical opening 35 of the piston 34. Upon the nut 39 rests a heavy main spring 41 upon which depends almost entirely the task of controlling the pressure delivery at the pipe 22.

The cap 11 is provided with a chamber 42 to which is connected the exhaust pipe 43. The upper end 44 of the cap 11 is turned on the outside and counterbored on the inside to receive an operating nut 45 which is held downwardly by a nut 46 and is held against rotation by a pin 47. Passing through the operating nut 45 is an operating screw 48 whose thread 49 is adapted to engage the groove 50 in the nut 45. On the upper end of the screw 48 is secured a hand lever 51 by means of a key 52, while the hub 53 of the lever 51 fits snugly upon the end 44 and the frictional relation between these parts may be regulated by means of the screws 54.

Passing vertically through the operating screw 48 is a stem 55 whose shoulder 56 bears against the under side of the operating screw 48, and whose upper end is provided with a nut 57 which permits rotation of the parts 55 and 48. The lower end of the stem 55 is hollow and its recess 58 is provided with communicating passageways 59 which connect with the chamber 42. At the extreme lower end of the stem 55 and around the recess 58 is positioned the release valve seat 60 which is adapted to engage the valve 33 under certain conditions. A cup leather 61 is mounted in the lower end of the cap 11 and bears against the outside of the stem 55 and is held in position by the nut 62.

The operation of the device is as follows: When the lever 51 is moved to the position shown in Figure 1, which may be either that of rest when no pressure is applied to the valve or when the controlled supply has reached the pressure predetermined by the setting of the lever 51. If the lever 51 is now moved in the direction indicated as "apply" in Figure 5 and there is an excess of pressure available at the pipe 19 the parts now assume the position shown in Figure 2, that is, the inlet valve seat 31 has been pushed away from the inlet valve 37 permitting air to pass from the pipe 19 directly out through the pipe 22. However, as pressure builds up inside of the enlarged cavity 20 the piston 34, with the assistance of the spring 41, again closes the inlet valve 37 until such a time as pressure has been reduced in some manner from the delivery pipe 22. This may, of course, be either by leakage or actual use of the air, as is well understood.

Should it now be desired to release or even reduce the pressure at the pipe 22 it is only necessary to move the lever 51 in the opposite direction, which will move the stem 55 to the position shown in Figure 4—namely, with the inlet valve 37 closed and the release valve open permitting either a free or restricted passage of air from the pipe 22 to the chamber 42 from which it can be disposed of through the pipe 43, depending entirely upon the position of the lever 51.

Since these devices are often employed in connection with vibrating parts it is preferable to frictionally hold the lever 51 by means of the screws 54, as above suggested.

It can also be seen that the capacity of this device to handle air is restricted only by the size of the pipes leading thereto, since the manner in which the valves are operated provides almost a complete valve opening with only a limited longitudinal travel of the parts.

For the sake of convenience the chamber below the piston 34 shall be referred to as the high pressure chamber and the cavity 20 shall be referred to as the controlled pressure chamber, while the chamber 42 shall be referred to as the exhaust chamber.

It is, of course, well understood that many forms of variable pressure valves have been constructed in the past in which the objects herein attained were aimed at but accomplished only with limited degrees of success. The principal objection to earlier and existing forms of this device was the difficulty of maintaining anything like a suitable working relation between the parts, due principally to wear occasioned by the manner in which the pressures were regulated, resulting, in some cases, in devices which were extremely noisy on account of their unstable controlling elements, it is therefore my intention to cover only such forms and modifications of this device as fall fairly within the appended claims.

I claim:

1. A variable pressure valve having a body, a main piston mounted in said body having an opening formed therein, an auxiliary piston mounted in said body having a piston rod thereon, an inlet valve between said rod and piston opening, a main spring against the opposite side of said piston from the inlet valve, a cap for said body, a stem mounted in said cap, a release valve formed between the lower end of said stem and the upper end of said rod said stem having an opening controlled by said release valve communicating with the exterior of said cap, and means for affecting the vertical position of said stem.

2. A variable pressure valve having formed therein a high pressure chamber, a controlled pressure chamber and an exhaust chamber all in axial alignment, a piston between said high pressure chamber and controlled pressure chamber having an opening therein, a double valve within said piston one side of which closes said piston opening from its high pressure side and the other side of said valve projecting into said controlled pressure chamber, an axially slidable outlet stem adapted to be closed by the valve in said controlled pressure chamber, means for slidably positioning said outlet stem, and a main spring urging said piston toward the high pressure chamber.

3. A variable pressure valve consisting of a body having a high pressure and a controlled pressure chamber formed therein, a piston slidably mounted between said high and low pressure chambers, a main spring urging said piston toward said high pressure chamber, said piston having an opening formed therein having a closing valve on its high pressure side, said closing valve having a release valve attached thereto projecting into said controlled pressure chamber, a hollow stem projecting through said body into said controlled pressure chamber adapted to be closed by said release valve when in engagement therewith, and means for slidably positioning said hollow stem.

4. A variable pressure valve consisting of a body having a cylindrical high pressure chamber formed therein, a piston forming one end of said high pressure chamber having an opening through same, a balanced inlet valve for said opening slidably mounted therein, a release valve connecting with said inlet valve and projecting through the opposite end of said piston, a hollow stem passing through said body adapted to be closed by said release valve, a main spring urging said piston toward said inlet valve, and manualy operated screw means for slidably positioning said stem for the purpose of varying the compression of said main spring.

5. A variable pressure valve consisting of a body having a controlled pressure chamber formed at the top thereof, a high pressure chamber formed at the middle thereof and having a piston forming one end of said high pressure chamber, said piston having an opening formed through same, a balanced inlet valve against the under side of said piston opening having means for slidably mounting same in the lowermost part of said body and in the piston opening, a release valve integral with said inlet valve projecting into said controlled pressure chamber, a main spring on said piston, a cap over said main spring forming a closure for said body, said cap having an exhaust chamber formed therein, a hollow control stem passing downwardly through said cap and chamber having its lower end adapted to seat upon said release valve and having side outlets therein communicating with said exhaust chamber, and a screw feed for adjusting the vertical height of said stem, said high pressure chamber having an inlet supply pipe attached thereto, said controlled pressure chamber having a delivery pipe attached thereto.

6. A variable pressure valve having a cylindrical body member, a balanced inlet valve mounted in the lower end of said body member, a piston slidably mounted in said body having an opening therein adapted to be closed by said inlet valve, said body having an inlet opening for admitting high pressure air to the inlet valve side of said piston, a main spring on the upper side of said piston urging same to seat upon said inlet valve, a release valve integral with said inlet valve extending upwardly through said piston opening, a vertically slidable control stem projecting through said body and seating upon said release valve, screw means for moving said stem vertically, and a handle for rotating said screw.

7. A variable pressure valve having a body and having disposed therein in successive order a balanced inlet valve, a ported piston adapted to be closed by said inlet valve, a release valve over said piston and joined to said inlet valve, a tubular control stem seating upon said release valve, a main spring upon said piston, a cap upon said body forming a retainer for said spring, a guide for said tubular control stem said stem and cap having side outlet openings for the escape of air admitted to said stem when uncovered by said release valve, an externally threaded sleeve forming a screw for operating said stem, a nut receiving said sleeve, a control lever for rotating said sleeve in a manner to vary the compression of said main spring for the purpose of controlling the pressure which can be built up around said main spring, and means for delivering air from the chamber containing said main spring to an outside device.

8. A variable pressure valve having a high pressure chamber, a controlled pressure chamber and an exhaust chamber formed therein with communicating pipe lines therefor, a ported piston slidably mounted therein between said high pressure chamber and said controlled pressure chamber, a control valve stem having a tubular end slidably projecting into said controlled pressure chamber, a balanced double valve slidably mounted in said piston the top side of which forms a closure for said control valve stem and the bottom side of which forms a closure for said piston, and manually operated means for slidably positioning said control valve stem for the purpose of determining the pressure at which said inlet valve will close the port in said piston.

9. A variable pressure valve having in combination a cylindrical body having mounted in the middle thereof a main piston provided with a central opening, an auxiliary piston mounted in the bottom thereof having a spring on its under side which under side is open to the atmosphere, an inlet valve on said auxiliary piston adapted to be balanced thereby, a release valve above said piston integral with said inlet valve, a main spring on the top side of said piston, an outlet in said body for the delivery of air from the top side of said piston, a second outlet adapted to be closed by said release valve, and means for adjusting the point at which said release valve shall close said last mentioned outlet.

10. A variable pressure valve having in combination a cylinder having a high pressure chamber at one end thereof with an inlet thereto, a controlled pressure chamber at the other end thereof having an outlet therefrom, a main piston in said cylinder between said chambers having a port formed therethrough, an auxiliary piston on one side of said high pressure chamber opposite said main piston, said auxiliary piston having a rod extending through the port in said main piston, said rod having an inlet valve in said high pressure chamber adapted to close said port when said piston is moved downwardly, a main spring in said controlled pressure chamber urging said piston downwardly to a seat with said inlet valve, an auxiliary spring under said auxiliary piston urging said inlet valve to a seat with said main piston, means for releasing air from said controlled pressure chamber consisting of a slidable outlet tube extending into said controlled pressure chamber, a release valve forming a closure for said outlet tube said release valve forming a part of said auxiliary piston and inlet valve, and means for manually adjusting the amount which said outlet tube projects into said controlled pressure chamber.

CHESTER J. SIEFARTH.